United States Patent [19]

Mugishima

[11] 4,024,945
[45] May 24, 1977

[54] APPARATUS FOR TRANSFERRING FORMED UNBAKED AND BAKED DOUGH AND CONFECTIONARY FROM A FEED CONVEYOR THROUGH A TRANSFER CONVEYOR ONTO A RECEIVING CONVEYOR

[76] Inventor: Hirobumi Mugishima, 1170, Hei, Nissato, Utsunomiya, Tochigi, Japan

[22] Filed: Feb. 9, 1976

[21] Appl. No.: 656,364

[30] Foreign Application Priority Data

Feb. 10, 1975 Japan .............................. 50-17144

[52] U.S. Cl. .............................. 198/424; 198/426
[51] Int. Cl.² ......................................... B65G 47/26
[58] Field of Search ....... 198/31 R, 31 AA, 31 AB, 198/31 AC, 35, 88, 420, 424, 426, 433, 436, 485, 471; 53/160, 244; 214/1 BD, 6 D, 6 DK

[56] References Cited

UNITED STATES PATENTS 2,080,858  5/1937  Dorman ........................ 198/31 AA

FOREIGN PATENTS OR APPLICATIONS

293,418    5/1914  Germany ...................... 198/31 AA
1,005,370  9/1965  United Kingdom ............. 214/6 DK
177,334    5/1966  U.S.S.R. ........................ 198/31 AA

Primary Examiner—Johnny D. Cherry
Assistant Examiner—Douglas D. Watts
Attorney, Agent, or Firm—Guy W. Shoup

[57] ABSTRACT

Apparatus for transferring formed articles such as confectionery, bread or the like from a feed conveyor through a displaceable transfer conveyor onto a receiving conveyor, trays or boxes without tumbling, deforming or injuring the formed articles, the transfer conveyor being moved substantially downwardly at a velocity greater than the falling speed by gravity of the articles thereon, and then swung substantially laterally at a velocity sufficient to avoid contacts with the falling articles, and finally returned to its original position, the movement of the transfer conveyor being regulated by two cam devices, one of which is arranged to regulate the vertical movement of the transfer conveyor and the other of which is arranged to regulate the swinging motion of the transfer conveyor.

1 Claim, 7 Drawing Figures

APPARATUS FOR TRANSFERRING FORMED UNBAKED AND BAKED DOUGH AND CONFECTIONARY FROM A FEED CONVEYOR THROUGH A TRANSFER CONVEYOR ONTO A RECEIVING CONVEYOR

The present invention relates to an apparatus for transferring formed articles such as confectionery, bread or the like from a conveyor to a different conveyor or containers such as trays, boxes etc. by means of a displaceable transfer belt conveyor without tumbling, deforming or injuring the formed articles.

The apparatus of the present invention comprises the transfer belt conveyor, means for driving the belt of said transfer conveyor for reception and positioning of said articles thereonto ("first means" hereinbelow), and means for causing said transfer conveyor to move substantially downwardly and then swing substantially laterally with a changeable radius of rotation about an axis fixed parallel to the direction of movement of the belt of said transfer conveyor and positioned thereabove, and finally return to its original position ("second means" hereinbelow). The transfer conveyor receives articles from a feed conveyor and, by first downward and then lateral quick receding movement, the transfer conveyor transfers the articles thereon to a receiving conveyor or containers ordinarily positioned underneath the transfer conveyor.

A similar apparatus is described in U.S. patent application Ser. No. 618,059 now U.S. Pat. No. 3,989,134 filed on Sept. 30, 1975. The present invention is an improvement over the invention disclosed in said U.S. application. Said U.S. application provides a transfer apparatus comprising a displaceable transfer belt conveyor which receives articles from a feed conveyor and transfers them to a receiving conveyor, trays or boxes, means for driving the belt of said transfer conveyor for reception and positioning of articles thereonto, and means for causing said transfer conveyor to move substantially downwardly and then swing substantially laterally about an axis fixed parallel to the direction of movement of the belt of said transfer conveyor and positioned thereabove, and finally return to its original position. The displacement of the transfer conveyor is conducted by the rotation of a crank arm provided with a crank pin at the outward end, said pin engaging a vertical shaft supporting the transfer conveyor at the lower end thereof so as to transmit the rotation of the crank arm to the transfer conveyor. Thus, the transfer conveyor conducts oscillatory movements following a locus defined by the movement of the crank arm and the mode of engagement between the crank arm and the vertical shaft supporting the transfer conveyor.

In this kind of transfer apparatus, it is often required that the vertical displacement of the transfer conveyor be minimized, for reasons that walls of containers on the receiving conveyor should not be hit by the failing transfer conveyor, and that in case articles to be transferred are extremely soft it becomes necessary to decrease the vertical distance between the upper surface of the transfer conveyor and the upper surface of the receiving conveyor or container thereon so as to avoid injury to or deformation of the articles by the crush against the receiving surface. Though the invention of the above U.S. application may attain such purpose to some extent by, for instance, decreasing the length of the crank arm, if the vertical displacement of the transfer is decreased, the length of the lateral displacement of the transfer conveyor is also proportionally decreased, thereby inviting a situation where the lateral movement is not sufficient to avoid contact with articles being transferred or where the transfer conveyor is caused to return to its original position too quickly before the articles transferred have been fed out.

Further, the reduction in length of the crank arm would accompany difficulties such as the need for shifting the position of the crank shaft so as to make it closer to the vertical support shaft, replacing the vertical support shaft with a different vertical support shaft having a slot of a different shape, and the like.

The present invention eliminates these difficulties, and is basically different from the invention of said U.S. application in that the present apparatus contains two cam means, one of which is arranged to regulate the vertical movement of said transfer conveyor and the other of which is arranged to regulate the swinging motion of said transfer conveyor. The configuration of the aforesaid locus can be readily modified as desired by merely changing said two cam means. The vertical distance between the upper surface of the transfer conveyor and the receiving container when it is disposed therebelow, can be controlled readily by altering the cam means regulating the vertical movement of the transfer conveyor. Particularly, the present apparatus has such a feature that the said distance can be substantially decreased without any difficulty in comparison with the case of the apparatus disclosed in said U.S. specification. Thus, the apparatus of the present invention is particularly effective for preventing relatively soft articles from crushing upon transfer onto the receiving container. Also, tall articles may be securely transfered without tumbling or rolling. If the vertical displacement of the transfer conveyor is minimized, containers with relatively tall side walls may be placed on the receiving conveyor without the transfer conveyor contacting such containers.

Additionally, the speed of the transfer conveyor can be regulated to be slow in its return movement by the cooperation of said two cam means, whereby the transfer conveyor can avoid contacts with the falling articles therefrom. Because of the use of cams for displacement of the transfer conveyor in the manner as described hereinbelow, the apparatus of the present invention may be operated without making any substantial noise by avoiding mechanical impacts.

According to the present invention, there is provided an apparatus for transferring formed articles such as confectionery, bread or the like from a feed conveyor onto a receiving conveyor or containers such as trays, boxes etc., comprising a displaceable transfer belt conveyor which receives articles from the feed conveyor and transfers them to the receiving conveyor, trays or boxes, a "first means", namely, means for driving the belt of said transfer conveyor for reception and positioning of said articles thereonto, and a "second means", namely, means for causing said transfer conveyor to move substantially downwardly and then swing substantially laterally with a changeable radius of rotation about an axis fixed parallel to the direction of movement of the belt of said transfer conveyor and positioned thereabove, and finally return to its original position, said first means comprising a drive roller engaging the belt of said transfer conveyor for driving said belt, at least one vertical rod operatively connected at its bottom portion to said drive roller perpendicularly thereto, a first motor, and a transmitting means for transmitting the driving force of said motor to said vertical rod thereby to rotate it about its own axis, characterized in that said second means comprises means for rotating said vertical rods about said fixed axis, containing at least one cylindrical housing mounted so as to be swingable about said fixed axis and encasing said vertical rod so as to allow the axial rotation and lengthwise sliding motion of said vertical rod, a longitudinally elongated slot formed on said cylindrical housing at the desired position, an elongated pin parallel to said fixed axis adapted to engage said slot slidably, a crank arm elastically supporting said pin at one end, said crank arm being fixedly secured to a crankshaft and rotatable thereby to cause said pin to perform a substantially circular motion, a cam for restricting the motion of said pin to follow the surface of said cam in cooperation with the action of said spring, and a second motor for rotating said crank arm for a full turn after the predetermined number of aricles are fed onto said transfer conveyor, and means for changing the radius of rotation containing a guide plate secured fixedly to said crankshaft, which is provided with an annular slot forming a predetermined cam surface, rod means provided with a roller which slidably fits in said annular slot, said rod means being pivotably mounted at one end on said crankshaft, a spline formed on said vertical rod and said transmitting means thereby to allow said vertical rod to slide through said transmitting means, and a mechanism which is adapted to displace said vertical rod vertically in response to the lengthwise movement of said rod means which is caused by the coaction of said roller and said annular slot during the rotation of said guide plate.

It is, thus, an object of the present invention to provide an apparatus fo transferring formed articles having various shapes of formed articles from a feed conveyor onto a receiving container without the articles being hit by the transfer conveyor while they are falling therefrom.

Another object of the present invention is to provide an apparatus for transferring relatively soft articles from a feed conveyor onto a receiving container without crushing upon transfer.

The above and other objects, features and advantages of the invention will be apparent in the undermentioned detailed description.

For a better understanding of the invention, reference will now be made by way of an example to the accompanying drawings, in which.

Figure 1:
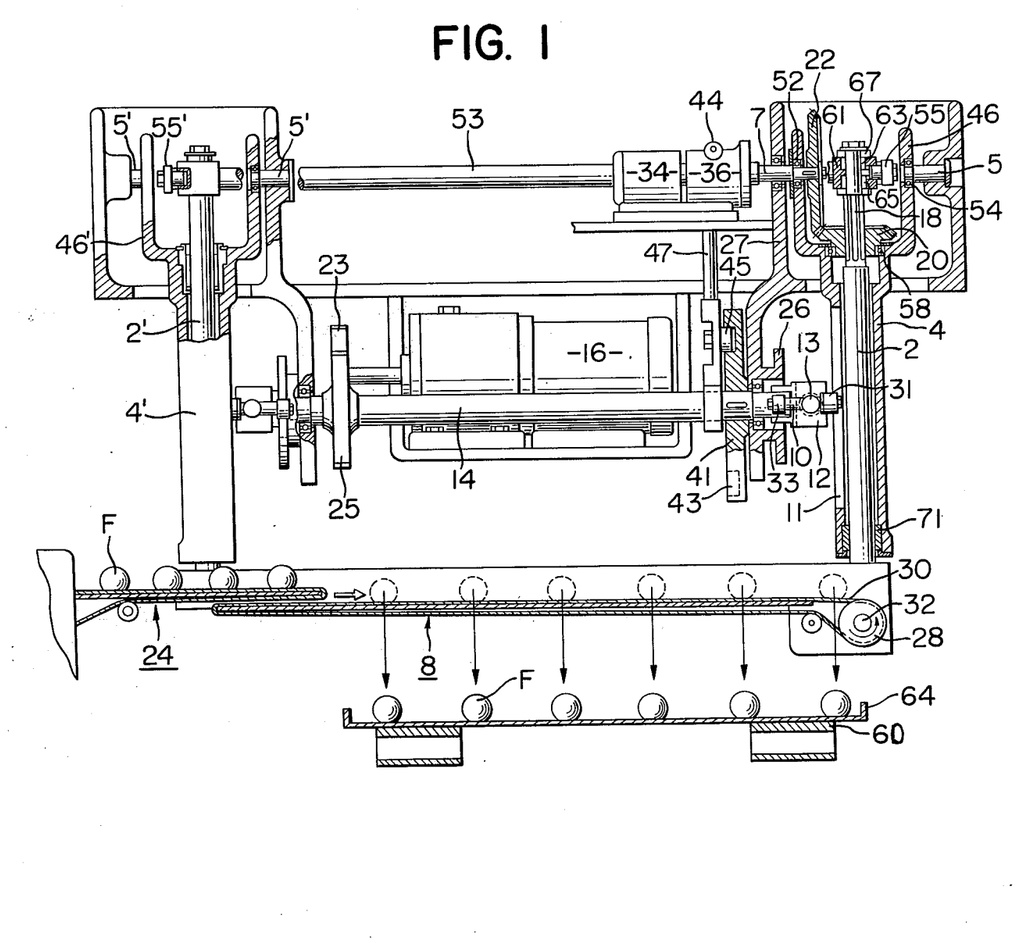
FIGS. 1 and 2 are an elevational front view and a plan view, respectively, partly in section, of an embodiment of an apparatus according to the present invention.
Figure 2:
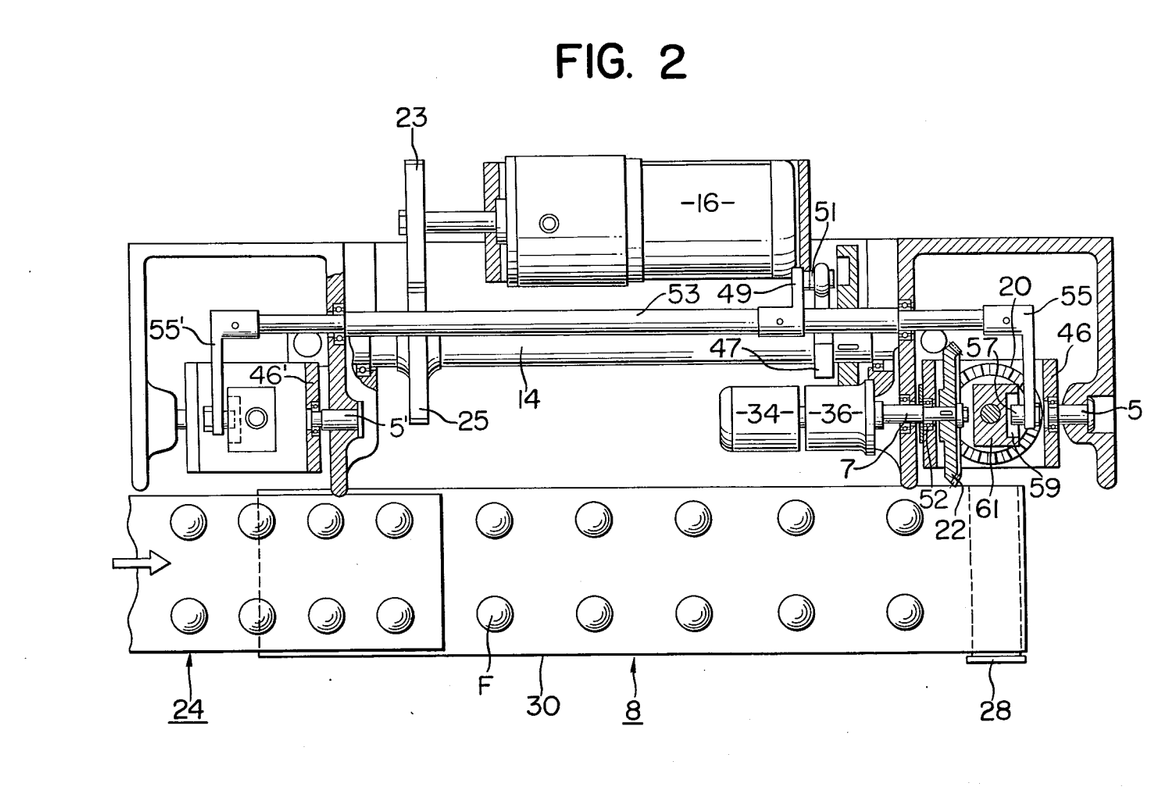

In FIG. 1, a splined vertical rod 2 encased in a cylindrical housing 4 is swingable about a common axis for a fixed shaft 5 and an input shaft 7 by means of devices as explained hereinbelow, and slidable in its lengthwise direction through the cylindrical housing 4 by means of devices as explained hereinbelow. A transfer conveyor 8 is connected to the lower end of the vertical rod 2, and consequently, the distance between said axis and the transfer conveyor 8 may be variable while the latter oscillates. The shaft 5 is fixedly mounted on the frame 27. The shaft 7 is rotatably mounted on the frame 27. A bracket 46 is supported by the shafts 5 and 7, and is integrally connected to the cylindrical housing 4.

A one-rotation step motor 16 rotates intermittently a crank shaft 14, each time by one rotation, through a gear 23 mounted on a drive shaft extending from the motor 16 and a gear 25 engaging said gear 23 and mounted on the crank shaft 14.

A crank arm 12 fixedly connected to an end of the crank shaft 14 rotates stepwise one rotation at a time. The crank arm 12 has a recess in the middle of its body. In other words, the crank arm has a projection at both ends. Each projection is provided with a through hole. The two holes are axially aligned and a shaft 13 is inserted through them and is held slidable. The shaft 13 has an enlarged portion at an end, thereby forming a shoulder 9. A tension coil spring 19 is fixedly attached at one end to the shoulder 9 of the shaft 13 and at the opposite end to a projection 29 provided at an end of the crank arm 12.

Cam followers 31 and 33 are mounted respectively, on the opposite ends of an elongated pin 10 attached to an end of the shaft 13. Opposite to the enlarged portion, at right angles relative to the axis of the shaft 13. The cam follower 31 is slidably fitted into an axially elongated slot 11 formed at a predetermined portion of the cylindrical housing 4, while the cam follower 33 always contacts the outer circumference of a substantially circular cam plate 27, fixed to the frame 27 around the crank shaft 14, by the action of the spring 19 and rotates in the direction of an arrow $d$ along a locus as shown at (1) in FIG. 3, along with the rotation of the crank arm 12.

Figure 3:
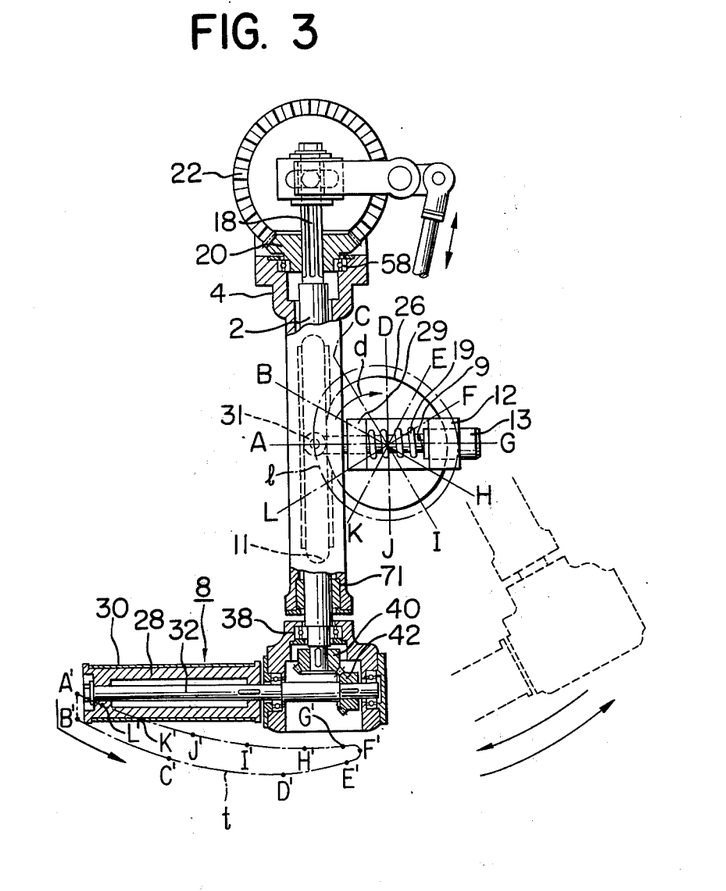
FIGS. 3 and 4 are side views, partly in section, of a portion of the apparatus of FIG. 1 or 2, and illustrate a device for rotating vertical rods about a fixed axis and a device for changing the radius of rotation, respectively.

The cam plate 26 guides the cam follower 33 and hence the cam follower 31 so that the cylindrical housing 4 and hence the transfer conveyor 8 swings laterally with a sufficiently fast withdrawing velocity for enabling articles F to drop and with relatively slow returning motion to reduce mechanical impacts.

A substantially circular guide plate 41 has at its central portion a through hole complementary with the crank shaft 14 and is fixedly mounted on the latter. Thus, it is rotated in the direction of the arrow $d$ in FIG. 4 by the crankshaft 14 in the similar manner as the cam followers 31 an 33. The guide plate 41 is provided in its side face with an annular slot 43 into which a roller 45 is slidably fitted. The roller 45 is rotatably mounted on a middle part of a side of a rod 47. The upper end of the rod 47 is pivotally connected to one end of a first lever arm 49 through a pin 51, and the lower end of the rod 47 is bifurcated and engages the crankshaft 14 rotatably and slidably, in such a manner as to ride astride of the crank shaft 14. The opposite end of the first lever arm 49 is securely fixed to a level fulcrum shaft 53 extending horizontally, and mounted rotatably on the frame 27. The rod 47 performs an up-and-down movement as indicated by an arrow $m$ in FIG. 4.

Figure 4:
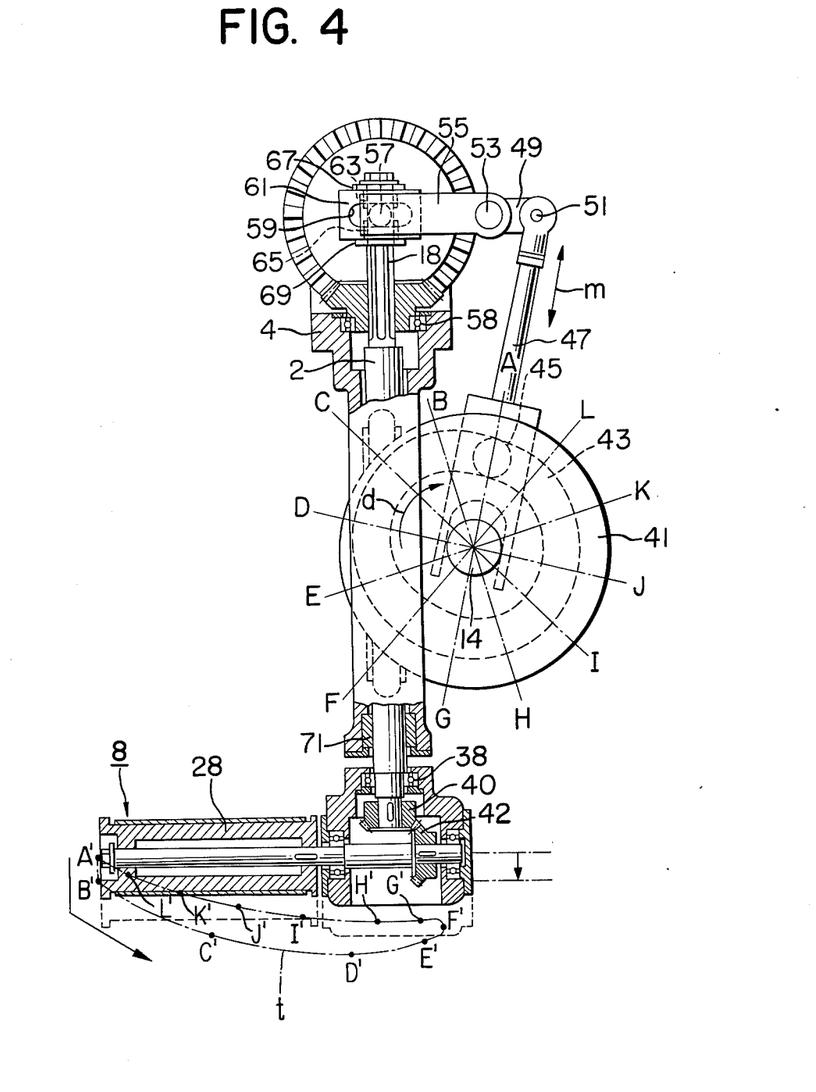
Figure 5:
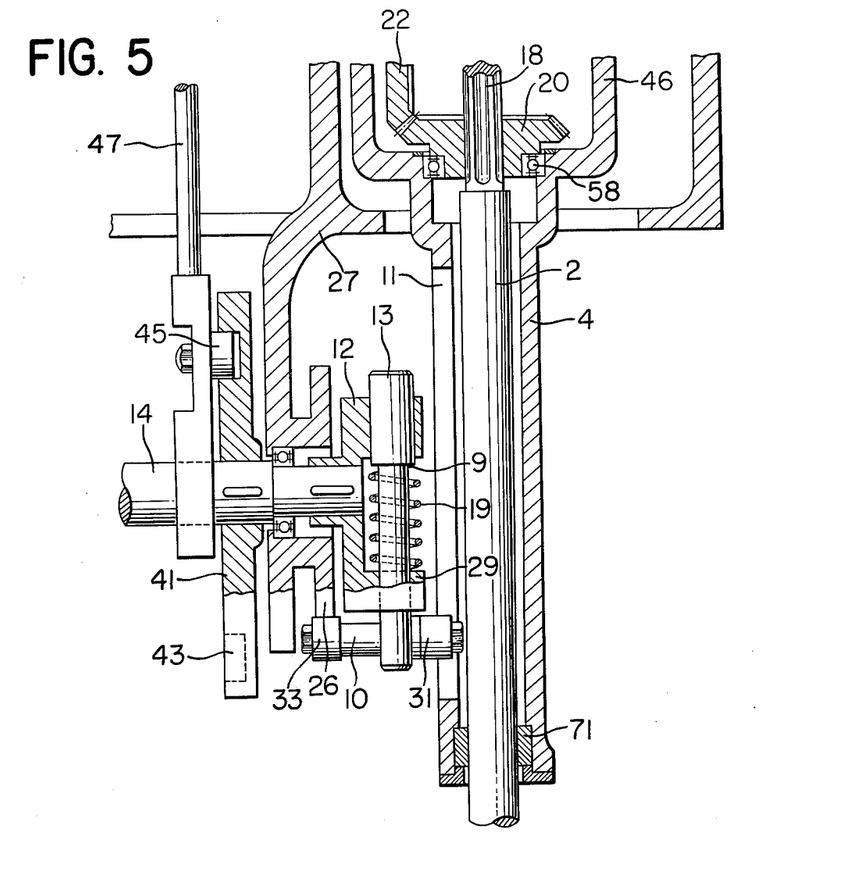
FIG. 5 is an enlarged view of a part of the apparatus illustrated in FIG. 1, the cam follower 31 being in the position of point J.

A second lever arm 55 functions in a manner similar to the first lever arm 49. The second lever arm 55 is fixed at an end thereof to the lever fulcrum shaft 53 and provided at the other end with a rotatable pin 57, which is slidable along a lateral slot 59 formed in a bracket 61.

The splined vertical rod 2 passes through a through hole provided in the bracket 61 and is rotatable therein. The combination of the pin 57 and the slot 59 prevents interferences between the linear motion of the splined vertical rod 2 and the arcuate motion of the pin 57.

Plain bearings 63 and 65 are provided at the upper and lower ends, respectively, of the bracket 61. The plain bearings 63 and 65 are held in place by thrust washers 67 and 69, respectively, provided outside thereof. The bearings 63 and 65 and washers 67 and 69 smoothly guide the axial rotation and linear vertical movement of the splined vertical rod 2.

Referring to FIGS. 1, 3 and 4, the output of a motor 34 is transmitted through a rotation regulator 36 to the input shaft 7, and a bevel gear 22 which is secured to the end of the shaft 7, transmits the rotation to a bevel gear 20 meshing therewith. The bevel gear 20 is provided with a through hole at the central portion thereof and the hole is provided with a plurality of vertical grooves. The bevel gear 22 engages a splined vertical rod 2 having a plurality of axis grooves 18 mating with the grooves of the bevel gear 22 to transmit the rotation thereto. The bevel gear 22 and the vertical rod 2 engage each other when they are rotated in the radial direction, but permit the movement of the vertical rod 2 in the axial direction.

The vertical rod 2 has at its lower end a bevel gear 40 fixed thereto, which gear 40 is meshed with a bevel gear 42, which in turn is fixedly mounted on one end of a roller shaft 32 of the drive roller 28. Thus, it will be clearly understood that the rotation of the motor 34 is transmitted to the belt 30 of the transfer conveyor 8.

A rotation adjustor handle 44 is provided on the regulator 36. By manipulating the handle 44 the number of rotations per unit time of the drive roller 28 is changed to vary the speed of the belt 30. Thus, by manipulating the handle 44 intervals between formed articles F on the transfer conveyor 8 can be readily adjusted.

The bevel gear 20 is rotatably mounted on a swinging bracket 46. Bearings 52 and 54 are inserted between the bracket 46 and the shafts 7 and 5, respectively, so as to permit the bracket 46 to swing smoothly. A bearing 58 is inserted between the bracket 46 and the bevel gear 20 to smoothen the rotation of the bevel gear 20. A slide metal 71 fixed to the lower end of the cylindrical housing 4 around its inner surface guides the rotation and the axial movement of the vertical rod 2.

The transfer conveyor 8 may often have a considerably long travelling distance when it is desired to transfer simultaneously a large number of formed articles. In such a case, it is practical that the transfer conveyor 8 is swung by at least two vertical rods 2 and 2′ as provided adjacent each of the opposite ends of the transfer conveyor 8, and at other places if required.

The structural difference between the vertical rods 2 and 2′ is that the vertical rod 2 is operatively connected to the drive roller 28 and its rotary input mechanism, whereas the vertical rod 2′ is not connected to any drive roller and any rotary input mechanism. Therefore, the vertical rod 2′ has no spline or axial grooves thereon unlike the splined vertical rod 2. A swinging bracket 46′ is supported by a pair of support shafts 5′, 5′, which are rotatably mounted on the frame 27. It should be noted that the shafts 5′, 5′ have the same axis of rotation with those of the shafts 5 and 7.

The operation of the apparatus to the present invention will next be described. What determines the vertical descent and sideward swing of the transfer conveyor 8 is the combined action of the cam 26 which guides the cam follower 33 along its circumference and the roller 45 which is movably fitted into annular slot 43. By the intermittent rotation of the one-rotation step motor 16 and through the gears 23 and 25, the crank shaft 14 revolves to rotate the cam followers 31 and 33 in the direction of the arrow d in FIG. 3 and also rotate the guide plate 41 in the direction of the arrow d in FIG. 4.

Points A, B, C, . . . , L on the locus of the cam follower 33 or the roller 45 and points A′, B′, C′, . . . , L′ on the locus t of the extremity of the transfer conveyor 8 in FIGS. 3 and 4 correspond to each other. The position indicated by point A is the position of the crank shaft 14 at the start of its rotation and is, at the same time, the position thereof at the time the rotation is completed.

When the guide plate 41 rotates and the roller 45 moves from point A to point B of the annular slot 43, the extremity of the transfer conveyor 8 moves from point A′ to point B′ as indicated by the arrow t in FIG. 4. The annular slot 43 rapidly recedes from the center of the crankshaft 14 as the guide plate 41 rotates from point A to point B, so that the annular slot 43 rapidly pushes up the rod means 47 between points A and B and rotates the first lever arm 49 through the rotatably provided pin 51. The rotation of the first lever arm 49 rotates the second lever arm 55 by rotating the lever fulcrum shaft 53 to which the first and second lever arms are fixed. The rotation of the second lever arm 55 pushes down the spline vertical rod 2 through the pin 57, the slot 59 into which the pin 57 is fitted movably, and the bracket 61 having the slot 59 so as to move the extremity of the transfer conveyor 8 between points A′ and B′.

When the guide plate 41 moves as described above, the cam follower 33 which is rotated by the crank arm 12 and is biased by the spring 19 moves between points A and B guided by the cam 26 in FIG. 3. In this case the cam follower 31 mounted on the same elongated pin as that on which the cam follower 33 is mounted and movably fitted in the elongated slot 11 does not move sideways and thus the extremity of the transfer conveyor 8 moves between points A′ and B′.

Next, when the cam follower 33 rotates from point B to point C, and then to point D, a rapidly receding movement of the transfer conveyor 8 is required for the uninterrupted downfall of articles F. For this purpose the distance between the cam follower 33 and the crankshaft 14 decreases rapidly from point B to point D to perform a rapid sideward swing. In the above case, the annular slot 43, as it advances from point B to point C and then to point D, goes gradually farther from the crankshaft 14, so that the end of the transfer conveyor 8 gradually descends while swinging sideways from point B′ as indicated by points C′ and D′ on the locus (t) thereof. When the cam follower 33 further rotates from point D to point E and comes to point F, the receding movement of the transfer conveyor 8 terminates. Around the lower dead point F′ a slow movement is required to reduce mechanical impact. To meet the above requirement, the circumference of the cam 26 is substantially linear from point D to the lower dead point F so that the sideward swing gradually dies down and the distance from the crankshaft 14 gradually increases so as to cause a slow movement. In this case the distance between the annular slot 43 and the center line of the crankshaft 14 decreases as the guide plate 41 moves from point D to point E and to point F so that the locus of the end of the transfer conveyor 8 goes upwards.

The cam follower 33, during its rotation from point F via points G, H, I, J, K and L to point A, guides the return motion of the transfer conveyor 8. During this period the distance of the cam follower 33 from the crankshaft is substantially constant and the cam follower 33 is positioned at greater distances from the shafts 5, 7 than when it is positioned at points B, C, D and E, resulting in slower movement of the transfer conveyor 8 so that the transfer conveyor 8 moves relatively slowly. In this case the curve of the annular slot 43 from point F via points G, H, I, J, K and L to point A so changes its distance from the crankshaft 14 as follows. The distance is substantially the same from point F to point I; gradually decreases from point I via point J to point K; and rapidly decreases from point K via point L to point A. In accordance with these changes the movement of the end of the transfer conveyor 8 is substantially horizontal from point F' via points G' and H' to point I'; gradually rises from point I' via point J' to point K'; and rapidly rises from point K' via point L' to point A' and returns to the initial point A'. By the above movement of the transfer conveyor, articles F supplied by the feed conveyor 24 are transferred to the container 64.

The speed of the sideward swing of the tranfers conveyor 8 can be determined as required by appropriately changing the shape of the cam 26 and the amount of the vertical movement of the transfer conveyor 8 and the shape of the movement locus can be determined as required by changing the guide plate 41 to one with a different shape of the annular slot 43. By doing so articles F on the transfer conveyor 8 can be transferred to a container positioned below the transfer conveyor 8 without tumbling or rolling.

What enables the above described movement of the transfer conveyor 8 is the splined vertical rod 2 which rotates so as to rotate the roller 28 for driving the endless belt 30 of the transfer conveyor 8 and at the same time performs vertical sliding motion defined by the annular slot 43. To satisfy the requirement for the splined vertical rod 2 to accomplish the above action, the upper end part of the splined vertical rod 2 is constructed in the following manner.

The annular slot 43 causes the rod means 47 to move as indicated by the arrow m through the roller 45 movably fitted in the annular slot 43 so as to push upwardly an end of the first lever arm 49. Then the lever fulcrum shaft 53 to which the other end of the first lever arm 49 is fixed is rotated so that the second lever arm 55 is rotated to tilt. On the end of the second lever arm 55 is rotatably mounted the pin 57 which is movable fitted in the elongated slot 59 formed in the bracket 61. With the descent of the end of the second lever arm 55, the pin 57 pushes down the bracket 61 while moving horizontally in the elongated slot 59. Then splined vertical rod 2 slides downwardly while its movement is restrained by the plain bearings 63 and 65 and the thrust washers 67 and 69 mounted on the upper and lower ends of the bracket 61.

While splined vertical rod 2 performs the sliding motion as described above, it also maintains its engagement with the bevel gear 20 by means of the splines 18 to continue its axial rotation caused by the input from the motor 34.

When it is necessary to stop the movement of the endless belt 30 during its swinging motion, an electromagnetic clutch may be provided between the motor 34 and the reduction gearing 36.

The bracket 61 mounted on the upper part of the splined vertical rod 2 is coupled with the splined vertical rod 2 through the plain bearings 63 and 65 and thrust washers 67 and 69 mounted on the upper and lower ends of the bracket, which bearings and washers permit the vertical sliding movement and the axial rotation of the splined vertical rod 2.

When the direction of movement of the endless belt 30 of the transfer conveyor 8 and the direction of movement of the conveyor 60, which may be chains, for transporting the container 64 are made to cross at right angles the "row" and the "column" of the transferred articles can be adjusted as required. Articles F manufactured by an apparatus not shown are supplied to the endless belt 30 of the transfer conveyor 8 from the feed conveyor 24. By adjusting the rotational speed of the motor 34 the speed of the endless belt 30 is changed and this results in changing the number of articles F fed. The change in the intervals of articles F in this manner determines the number of the columns formed on the container upon transfer.

By changing the speed of the conveyor 60 for transporting the container 64 the travelling speed of the container 64 is changed and this determines the number of the rows formed on the container upon transfer.

Figure 6A:
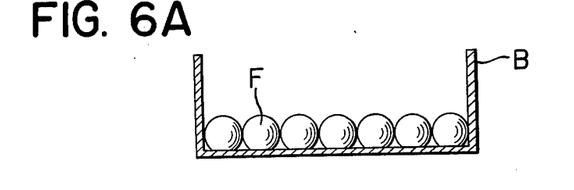
FIGS. 6A and 6B show two exemplified modes of arrangement of articles in a container upon transfer by the present invention.
Figure 6B:
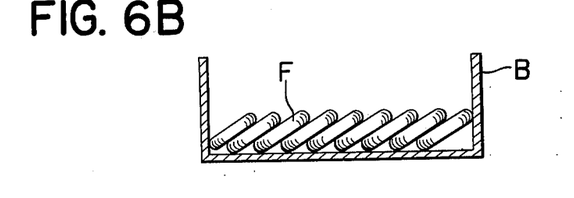

According to the present invention, as shown in FIG. 6A articles F may be placed in a box B having high side walls, or as shown in FIG. 6B they may be placed in a relationship where each pair of adjacent articles overlap each other.

Various modifications and improvements can be made herein without departing from the scope of the invention as disclosed in the appended claim. For instance, it is possible to use a cam along the inner circumference of which the cam follower 33 moves, in place of the described cam 26. Further, it is possible to rotate the cam follower 33 in the opposite direction to that of an arrow d in FIG. 3 by effecting necessary changes in the design of several members.

What is claimed is:

1. An apparatus for transferring formed articles such as confectionery, bread or the like from a feed conveyor onto a receiving conveyor comprising a displaceable transfer belt conveyor which rceives articles from the feed conveyor and transfers them to the receiving conveyor first, means for driving the belt of said transfer conveyor for reception and positioning of said articles thereonto and second means for causing said transfer conveyor to move substantially downwardly and then swing substantially laterally with a changeable radius of rotation about an axis fixed parallel to the direction of movement of the belt of said transfer conveyor and positioned thereabove, and finally return to its original position said first means comprising a drive roller engaging the belt of said transfer conveyor for driving said belt, at least one vertical rod operatively connected at its bottom portion to said drive roller perpendicularly thereto, a first motor, and a transmitting means for transmitting the driving force of said motor to said vertical rod thereby to rotate it about its own axis, characterized in that said second means comprises means for rotating said vertical rods about said fixed axis, containing at least one cylindrical housing mounted so as to be swingable about said fixed axis and encasing said vertical rod so as to allow the axial rotation and lengthwise sliding motion of said vertical rod, a longitudinally elongated slot formed on said cylindrical housing at the desired position, an elongated pin parallel to said fixed axis adapted to engage said slot slidably, a crank arm elastically supporting said pin at one end, said crank arm being fixedly secured to a crankshaft and rotatable thereby to cause said pin to perform a substantially circular motion, a cam for restricting the motion of said pin to follow the surface of said cam in cooperation with the action of said spring, and a second motor for rotating said crank arm for a full turn after the predetermined number of articles are fed onto said transfer conveyor, and means for changing the radius of rotation containing a guide plate secured fixedly to said crankshaft, which is provided with an annular slot forming a predetermined cam surface, rod means provided with a roller which slidably fits in said annular slot, said rod means being pivotably mounted at one end on said crankshaft, a spline formed on said vertical rod and said transmitting means thereby to allow said vertical rod to slide through said transmitting means, and a mechanism which is adapted to displace said vertical rod vertically in response to the lengthwise movement of said rod means which is caused by the coaction of said roller and said annular slot during the rotation of said guide plate.

* * * * *